US012172381B1

(12) United States Patent
Song et al.

(10) Patent No.: US 12,172,381 B1
(45) Date of Patent: Dec. 24, 2024

(54) METHODS FOR DESIGNING GRADIENT MINIMAL SURFACE STRUCTURES BASED ON SURFACE DENSITY DISTRIBUTIONS

(71) Applicant: BEIJING INSTITUTE OF TECHNOLOGY, Beijing (CN)

(72) Inventors: Weidong Song, Beijing (CN); Lijun Xiao, Beijing (CN); Genzhu Feng, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 0 days.

(21) Appl. No.: 18/646,737

(22) Filed: Apr. 25, 2024

(30) Foreign Application Priority Data

Jun. 8, 2023 (CN) .......................... 202310671920.5

(51) Int. Cl.
*B29C 64/386* (2017.01)
*B33Y 50/00* (2015.01)

(52) U.S. Cl.
CPC ............ *B29C 64/386* (2017.08); *B33Y 50/00* (2014.12)

(58) Field of Classification Search
CPC ... B29C 64/386; B33Y 50/00; G05B 19/4188; G05B 19/4086; G05B 2219/35214
See application file for complete search history.

(56) References Cited

U.S. PATENT DOCUMENTS

2021/0216683 A1* 7/2021 Rai ..................... B29C 64/386
2021/0316367 A1* 10/2021 Padilla ................. B33Y 50/00
(Continued)

FOREIGN PATENT DOCUMENTS

CN 111859693 A 10/2020
CN 112395746 A 2/2021
(Continued)

OTHER PUBLICATIONS

First Office Action in Chinese Application No. 202310671920.5 mailed on Jul. 11, 2023, 10 pages.
(Continued)

*Primary Examiner* — Michael M. Robinson
(74) *Attorney, Agent, or Firm* — PORUS IP LLC

(57) ABSTRACT

Disclosed is a method for designing a gradient minimal surface structure based on a surface density distribution. The method comprises initializing pending parameters of a two-dimensional surface equation and a minimal surface equation in a system; generating a plurality of pending parameter sets based on initial values and preset ranges of the pending parameters of the two-dimensional surface equation and the minimal surface equation using a CSPRNG; establishing a plurality sets of two-dimensional surface equations and a plurality sets of minimal surface equations; establishing a plurality of gradient structure equations; generating a plurality of three-dimensional models of minimal surface structures; making a plurality of gradient structure specimens by an additive manufacturing technique; obtaining a plurality sets of structure stress-strain curves and force-displacement curves by performing a test; calculating a platform stress and an energy absorption of the plurality of gradient structure specimens; and determining target structure types to realize an optimized design of the gradient minimal surface structure based on the surface density. The mechanical response stability and the energy absorption performance of the minimal surface structures can be improved.

1 Claim, 8 Drawing Sheets

(56) References Cited

U.S. PATENT DOCUMENTS

2022/0129595 A1    4/2022  Wang et al.
2024/0001619 A1*  1/2024  McCutcheon .......... B22F 10/80

FOREIGN PATENT DOCUMENTS

| CN | 113158526 A | 7/2021 |
|---|---|---|
| CN | 116059012 A | 5/2023 |

OTHER PUBLICATIONS

Decision to Grant a Patent in Chinese Application No. 202310671920.5 mailed on Jul. 21, 2023, 4 pages.

* cited by examiner

100

110

Generating a preparation instruction and sending the preparation instruction to a processing device.

111

Initializing pending parameters of a two-dimensional surface equation and a minimal surface equation in a system.

112

Generating a plurality of pending parameter sets based on initial values and preset ranges of the pending parameters of the two-dimensional surface equation and the minimal surface equation using a Cryptographically Secure Pseudo-Random Number Generator (CSPRNG)

113

Establishing a plurality sets of two-dimensional surface equations and a plurality sets of minimal surface equations based on the plurality of pending parameter sets

114

Establishing a plurality of gradient structure equations based on the plurality sets of two-dimensional surface equations and the plurality sets of minimal surface equation

115

Generating three-dimensional models of a plurality of minimal surface structures based on the plurality of gradient structure equations.

120

In response to determining that the three-dimensional models are generated, generating a making instruction and sending the making instruction to an additive manufacturing device

130

In response to determining that a plurality of gradient structure specimens are completed, generating a verification instruction and sending the verification instruction to a verification device

140

Generating an evaluation instruction based on a plurality sets of structure stress-strain curves and force-displacement curves and sending the evaluation instruction to a processing device

150

In response to determining that target structure types are determined, generating an update instruction and sending the update instruction to the processing device

FIG. 1

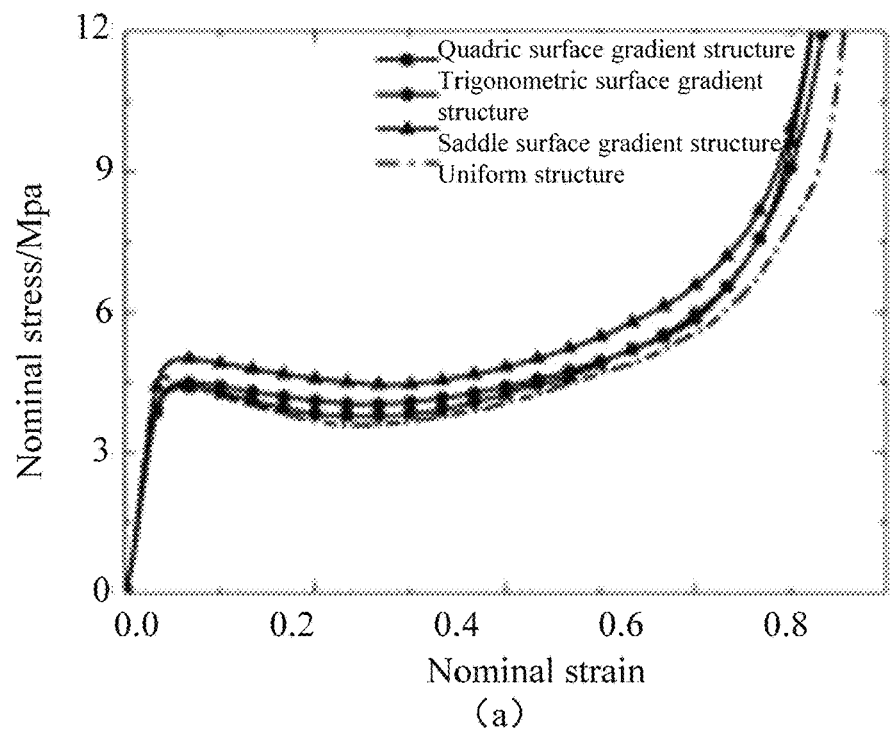
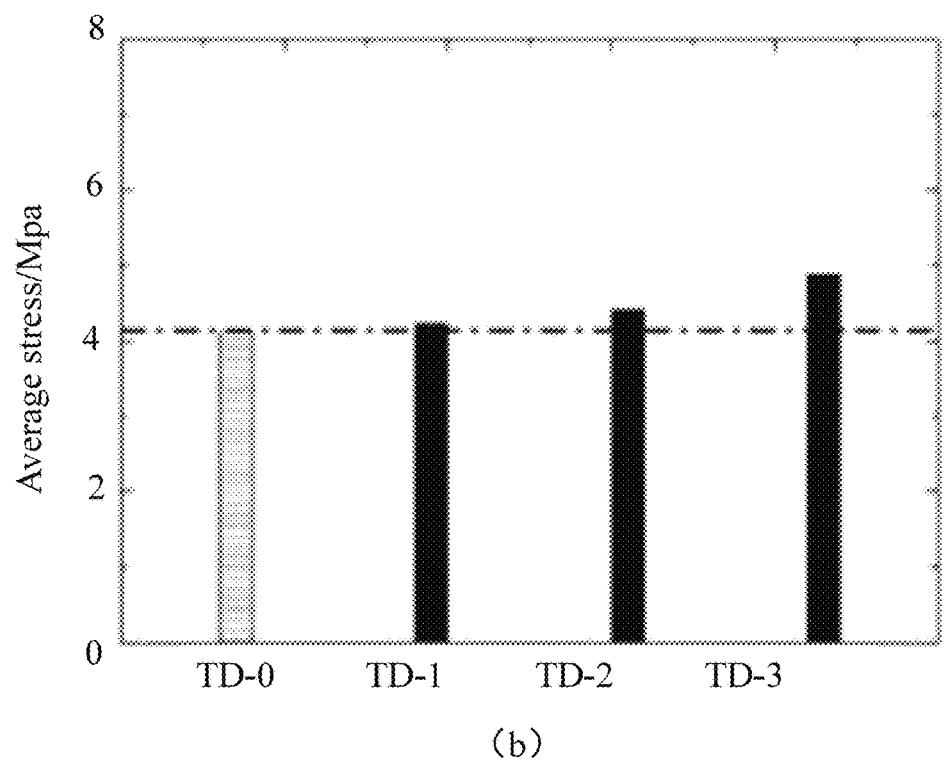
FIG. 5

METHODS FOR DESIGNING GRADIENT MINIMAL SURFACE STRUCTURES BASED ON SURFACE DENSITY DISTRIBUTIONS

CROSS-REFERENCE TO RELATED APPLICATIONS

This application claims priority to Chinese Application No. 202310671920.5, filed on Jun. 8, 2023, the entire contents of which are incorporated herein by reference.

TECHNICAL FIELD

The present disclosure relates to a technical field of minimal surface structure design, and in particular to a method for designing a gradient minimal surface structure based on a surface density distribution.

BACKGROUND

A minimal surface structure, as a new type of porous structure, has attracted much attention from researchers due to its stable mechanical response, excellent energy absorption performance, and stable deformation behavior. Depending on mathematical equations used in the modeling of the minimal surfaces, the minimal surface structures may have a variety of different structure forms, and the common structure types include Gyroid, Diamond, IWP, or the like. As for the minimal surface structures in the form of Gyroid, the deformation mode under an axial compression load is mainly "X"-shaped, and the whole structure is deformed like a drum. Therefore, there is a softening of the mechanical response of the structure during load bearing, which reduces the energy absorption performance. Existing research illustrates that gradient minimal surface structures have improved significantly in energy absorption, but the continued hardening behavior is not conducive to the protection of the object. It is therefore important to attenuate the softening behavior of the minimal surfaces to improve the energy absorption performance of the structures.

In general, the optimized design of the minimal surface structure has following main types: (1) functional gradient design, which establishes the gradient minimal surface structures by changing a wall thickness or a count of single cells of a structure along one direction; (2) cell hybrid design, which is implemented through the combination of several different minimal surface structures with each other; (3) multilevel structure design, which replaces the single cells of the structure with the minimal surface structures based on the concept of multilevel structures; and (4) model parameter optimization, which establishes structure models with different parameter configurations by changing the parameters of equations during the model construction.

The above methods do not sufficiently address the problems of the structure in terms of the mechanical response stability and the energy absorption enhancement. While the energy absorption performance of the structure is enhanced to a certain extent, the enhancement of the structure load bearing and the protection capability of the protected target is not addressed.

SUMMARY

An objective of some embodiments of the present disclosure is to provide a method for designing a gradient minimal surface structure based on a surface density distribution, which solves the problems of mechanical response and energy absorption of a Gyroid minimal surface structure, and further improves mechanical response stability and energy absorption performance of the minimal surface structure by studying several forms of relative density variations based on different types of two-dimensional surfaces.

In order to realize the above purpose, one of the embodiments of the present disclosure provides a method for designing a gradient minimal surface structure based on a surface density distribution. The method for designing the gradient minimal surface structure based on the surface density distribution may be implemented by a control center and comprises: generating a preparation instruction and sending the preparation instruction to a processing device, the preparation instruction being configured to control the processing device to perform a preparation task, and the preparation task including: initializing pending parameters of a two-dimensional surface equation and a minimal surface equation in a system; generating a plurality of pending parameter sets based on initial values and preset ranges of the pending parameters of the two-dimensional surface equation and the minimal surface equation using a Cryptographically Secure Pseudo-Random Number Generator (CSPRNG), the CSPRNG being stored in a storage device; establishing a plurality sets of two-dimensional surface equations and a plurality sets of minimal surface equations based on the plurality of pending parameters sets; establishing a plurality sets of gradient structure equations based on the plurality sets of two-dimensional surface equations and the plurality sets of minimal surface equations; and generating a plurality of three-dimensional models of minimal surface structures based on the plurality of gradient structure equations; in response to determining that the plurality of three-dimensional models are generated, generating a making instruction and sending the making instruction to an additive manufacturing device, the making instruction including the plurality of three-dimensional models, and operating parameters of the additive manufacturing device, the making instruction being configured to control the additive manufacturing device to make a plurality of gradient structure specimens based on the plurality of three-dimensional models by an additive manufacturing technique; in response to determining that the plurality of gradient structure specimens are completed, generating a verification instruction and sending the verification instruction to a verification device, the verification instruction being configured to control the verification device to perform a quasi-static compression test on the plurality of gradient structure specimens to obtain a plurality sets of structure stress-strain curves and force-displacement curves; generating an evaluation instruction based on the plurality sets of structure stress-strain curves and force-displacement curves and sending the evaluation instruction to the processing device, the evaluation instruction being configured to control the processing device to calculate evaluation results for the plurality of gradient structure specimens based on the plurality sets of structure stress-strain curves and force-displacement curves, and determining target structure types based on the evaluation results, the evaluation results including at least a platform stress and an energy absorption; and in response to determining that the target structure types are determined, generating an update instruction and sending the update instruction to the processing device, the update instruction being configured to control the processing device to convert the three-dimensional models, the evaluation results, the two-dimensional surface equations, and the minimal surface equations corresponding to the target structure types into standardized formats to be stored in a database, and generating an update message and transmitting the update message to an operator through a computer network.

BRIEF DESCRIPTION OF THE DRAWINGS

This disclosure will be further illustrated by way of exemplary embodiments, which will be described in detail by means of the accompanying drawings. These embodiments are not limiting, and in these embodiments, the same numbering indicates the same structure, wherein:

FIG. 1 is a flowchart illustrating an exemplary process for designing a gradient minimal surface structure based on a surface density distribution according to some embodiments of the present disclosure;

FIG. 5 is a schematic diagram illustrating mechanical response and platform stress curves of three gradient structure specimens and a Gyroid minimal surface structure specimen according to some embodiments of the present disclosure;

DETAILED DESCRIPTION

Figure 2:
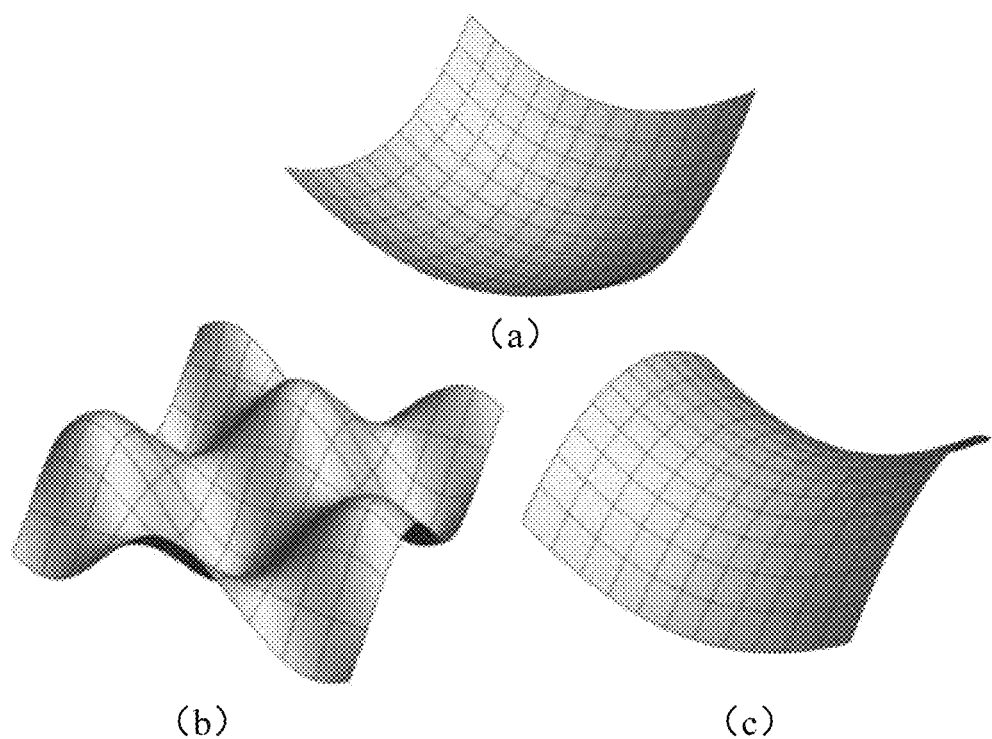
FIG. 2 is a schematic diagram illustrating three types of two-dimensional surfaces according to some embodiments of the present disclosure.

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a," "an," and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

FIG. 1 is a flowchart illustrating an exemplary process for designing a gradient minimal surface structure based on a surface density distribution according to some embodiments of the present disclosure. As shown in FIG. 1, a process 100 may include following operations. In some embodiments, one or more of the operations of the process 100 illustrated in FIG. 1 may be realized in a system for designing a gradient minimal surface structure based on a surface density distribution. For example, the process 100 illustrated in FIG. 1 may be invoked and/or executed by a control center of the system for designing the gradient minimal surface structure based on the surface density distribution. For case of description, the system for designing the gradient minimal surface structure based on the surface density distribution is hereinafter referred to as the system.

In 110, a preparation instruction may be generated and sent to a processing device.

The control center may be configured to control a plurality of units/sections in the system by generating instructions, and may be configured as a control panel for a user terminal of an operator. The user terminal may include a mobile device, a tablet, a laptop, or the like, or any combination thereof.

The processing device may be configured to process data related to the method for designing the gradient minimal surface structure based on the surface density distribution. In some embodiments, the processing device may be a single server or a group of servers. The group of servers may be centralized or distributed servers. In some embodiments, the processing device may be a local or remote processing device.

The preparation instruction refers to an instruction for controlling the processing device to perform a preparation task. The preparation task refers to a task for generating a plurality of three-dimensional models. More descriptions regarding the plurality of three-dimensional models may be found in the related descriptions below. In some embodiments, the preparation task may include the following operations.

In 111, pending parameters of a two-dimensional surface equation and a minimal surface equation in the system may be initialized.

In some embodiments, the system may include the control center, the processing device, a storage device, an additive manufacturing device, and a verification device. The processing device may be configured to process data related to the system. The storage device may be configured to store the data, the instructions, and/or any other information. More descriptions regarding the control center and the processing device may be found above and the related descriptions thereof. More descriptions regarding the additive manufacturing device and the verification device may be found below and related descriptions thereof.

In some embodiments, the storage device may store the data and/or the instructions related to the design of the gradient minimal surface structure based on the surface density distribution. For example, the storage device may store a pending parameter set. As another example, the storage device may store an instruction for processing the pending parameter set to determine a target structure type.

The two-dimensional surface refers to a curve surface that includes only length and width, not thickness. The two-dimensional surface equation refers to an equation that reflects a quantitative relationship satisfied by the two-dimensional surface.

In some embodiments, the two-dimensional surface may include a quadratic surface, a trigonometric surface, and a saddle surface. The two-dimensional surface equation may include a quadratic surface equation, a trigonometric surface equation, and a saddle surface equation.

For example, FIG. 2 is a schematic diagram illustrating three types of two-dimensional surfaces according to some embodiments of the present disclosure. FIG. 2(a) illustrates a quadratic surface. FIG. 2(b) illustrates a trigonometric surface. FIG. 2(a) illustrates a saddle surface. As illustrated in the figure, different forms of two-dimensional surfaces may include the quadratic surface, the trigonometric surface, and the saddle surface.

Correspondingly, the quadratic surface equation is expressed as an equation (1), the trigonometric surface equation is expressed as an equation (2), and the saddle surface equation is expressed as an equation (3):

$$z = a(bx^2 + by^2) + c \quad (1)$$

$$z = a\cos(b\pi x)\sin(b\pi y) + c \quad (2)$$

$$z = a(bx^2 - by^2) + c \quad (3)$$

wherein a, b, and c denote constants configured to regulate a magnitude and a distribution interval of a z-value in a surface; x denotes a value of an x-axis coordinate, y denotes a value of a y-axis coordinate, and z denotes a value of a z-axis coordinate.

Pending parameters of the two-dimensional surface equation refer to parameters to be determined for the two-dimensional surface equation. For example, in the two-dimensional surface equations shown in the equations (1), (2), and (3), a, b, and c denote the pending parameters. A value of each point in the surface may be regulated by changing the pending parameters of the two-dimensional surface equation.

For ease of description, the following two-dimensional surfaces are illustrated with examples of the two-dimensional surfaces including the quadratic surface, the trigonometric surface, and the saddle surface.

The minimal surface structure refers to a highly optimized geometric configuration composed of minimal surfaces. The minimal surface equation refers to an equation that reflects a quantitative relationship satisfied by the minimal surface structure.

In some embodiments, the minimal surface structure may include a Gyroid minimal surface structure. The Gyroid minimal surface equation is expressed as an equation (4):

$$\varphi(x,y,z) = \sin X \cos Y + \sin Y \cos Z + \sin Z \cos X = C \quad (4)$$

wherein $X = 2\alpha\pi x$, $Y = 2\beta\pi y$, and $Z = 2\gamma\pi z$, $\alpha$, $\beta$, and $\gamma$ denote constants configured to control a count of single cells of a structure along three directions; x denotes a value of an x-axis coordinate, y denotes a value of a y-axis coordinate, z denotes a value of a z-axis coordinate, and C denotes a constant.

Pending parameters of the minimal surface equation refer to parameters to be determined in the minimal surface equation. For example, in the minimal surface equation shown in the equation (4), $\alpha$, $\beta$ and $\gamma$ denote the pending parameters. The count of the single cells of the structure along the three directions may be controlled by changing the pending parameters of the minimal surface equation.

In some embodiments, the processing device may determine initial values of the pending parameters of the two-dimensional surface equation and the minimal surface equation based on a user input mode. In some embodiments, the processing device may use values with a highest frequency of each of the pending parameters in historical data as the initial values of the pending parameters of the two-dimensional surface equation and the minimal surface equation. The initial values of the pending parameters refer to initially determined pending parameters.

It should be understood that the initial values need to be within a preset range.

In 112, a plurality of pending parameter sets may be generated based on the initial values and preset ranges of the pending parameters of the two-dimensional surface equation and the minimal surface equation using a Cryptographically Secure Pseudo-Random Number Generator (CSPRNG).

The CSPRNG refers to a deterministic algorithm that generates seemingly random sequences of numbers. These sequences of numbers are not really random numbers, but they are sufficient in most application scenarios. The random numbers generated by the CSPRNG may be the same when the initial values and the preset ranges of the pending parameters are the same. In some embodiments, the CSPRNG is stored in the storage device.

The preset ranges refer to predetermined ranges of values for the pending parameters of the two-dimensional surface equation and the minimal surface equation. For example, the preset range of the pending parameter a may be $(a_m, a_n)$.

In some embodiments, the processing device may determine the preset ranges based on user input.

In some embodiments, the processing device may determine the preset ranges through a prediction model based on structure requirements. The prediction model may be a machine learning model. More descriptions regarding determining the preset ranges may be found in FIG. 8 and related descriptions thereof.

In some embodiments, the present ranges of the pending parameters a, b, and c of the quadratic surface equation, the trigonometric surface equation, and the saddle surface equation may be the same. Provided that the initial values of the pending parameters of the two-dimensional surface equation determined in the operation 111 are the same, the random numbers of a, b, and c corresponding to each of the three two-dimensional surface equations generated by the CSPRNG may be the same.

In some embodiments, the preset ranges of the pending parameters a, b, and c of the quadratic surface equation, the trigonometric surface equation, and the saddle surface equation may be different. On the premise that the initial values of the pending parameters of the two-dimensional surface equations determined in the operation 111 are the same, and that the preset ranges of the pending parameters a, b and c of the three two-dimensional surface equations are different, the random numbers of a, b and c corresponding to each of the three two-dimensional surface equations generated by the CSPRNG may be different.

The plurality of pending parameter sets refer to sets of the pending parameters. In some embodiments, the plurality of pending parameter sets may include a plurality of pending parameter sets of the two-dimensional surface equation, and a plurality of pending parameter sets of the minimal surface equation. For example, the plurality of pending parameter sets of the two-dimensional surface equation may be ($a_j$, $b_j$, $c_j$), and the plurality of pending parameter set of the minimal surface equation may be ($\alpha_j$, $\beta_j$, $\gamma_j$).

In some embodiments, when the preset ranges of the pending parameters a, b, and c of the quadratic surface equation, the trigonometric surface equation, and the saddle surface equation are the same, the random numbers of a, b and c corresponding to each of the three two-dimensional surface equations generated by the CSPRNG may be the same, and then the pending parameters of the three two-dimensional surface equations may be the same.

In some embodiments, when the preset ranges of the pending parameters a, b and c of the quadratic surface equation, the trigonometric surface equation, and the saddle surface equation are different, the random numbers of a, b, and c corresponding to each of the three two-dimensional surface equations generated by the CSPRNG may be different, and then the pending parameters of the three two-dimensional surface equations may be different.

In some embodiments, the processing device may generate a plurality of parameter values for each of the pending parameters based on the initial values and the preset ranges of the pending parameters of the two-dimensional surface equation and the minimal surface equation using the CSPRNG, and then generate the plurality of pending parameter sets by random combination.

For example, when the present ranges of the pending parameters a, b and c of the quadratic surface equation, the trigonometric surface equation, and the saddle surface equation are the same, taking the pending parameter a as an example, the pending parameter a may be initialized in the operation 111 to obtain an initial value $a_2$; and the processing device may generate a plurality of parameter values $\{a_1, a_2, \ldots, a_k\}$ of the pending parameter a based on the initial value $a_2$ and a preset range ($a_m$, $a_n$) of the pending parameter a by the CSPRNG. Similarly, a plurality of parameter values $\{b_1, b_2, \ldots, b_l\}$ for the pending parameter b, a plurality of parameter values $\{c_1, c_2, \ldots, c_p\}$ for the pending parameter c, a plurality of parameter values $\{\alpha_1, \alpha_2, \ldots \alpha_q\}$ for the pending parameter $\alpha$, a plurality of parameter values $\{\beta_1, \beta_2, \ldots, \beta_r\}$ for the pending parameter $\beta$, and a plurality of parameter values $\{\gamma_1, \gamma_2, \ldots \gamma_s\}$ for the pending parameter $\gamma$ may be generated. k, l, p, q, r and s denote counts of the pending parameters a, b, c, $\alpha$, $\beta$ and $\gamma$, respectively, and k, l, p, q, r and s may be the same or different.

The processing device may randomly combine the pending parameters a, b and c to obtain pending parameter sets of x sets of two-dimensional surface equations. For example, the pending parameter sets of the x sets of two-dimensional surface equations may be ($a_1$, $b_2$, $c_5$), ($a_1$, $b_2$, $c_3$). The processing device may randomly combine the pending parameters $\alpha$, $\beta$ and $\gamma$ to obtain pending parameter sets of y sets of minimal surface equations. For example, the pending parameter sets of the y sets of minimal surface equations may be ($\alpha_1$, $\beta_2$, $\gamma_5$), ($\alpha_1$, $\beta_2$, $\gamma_3$), or the like.

It should be understood that when the preset ranges of the pending parameters a, b and c of the quadratic surface equation, the trigonometric surface equation, and the saddle surface equation are different, the pending parameter sets of the quadratic surface equation may include u sets, the pending parameter sets of the trigonometric surface equation may include v sets, and the pending parameter sets of the saddle surface equation may include w sets.

In 113, a plurality sets of two-dimensional surface equations and a plurality sets of minimal surface equations may be established based on the plurality of pending parameter sets.

In some embodiments, when the present ranges of the pending parameters a, b and c of the quadratic surface equation, the trigonometric surface equation, and the saddle surface equation are the same, the processing device may substitute the pending parameter sets of the x sets of two-dimensional surface equations into the three two-dimensional surface equations to create 3x two-dimensional surface equations.

When the preset ranges of the pending parameters a, b and c of the quadratic surface equation, the trigonometric surface equation, and the saddle surface equation are different, the processing device may substitute the u sets of pending parameter sets into the quadratic surface equation, the v sets of pending parameter sets into the trigonometric surface equation, and the w sets of pending parameter sets into the saddle surface equation to create u+v+w two-dimensional surface equations. The processing device may substitute the y sets of pending parameter sets of the minimal surface equation into the minimal surface equation, respectively, to create y sets of minimal surface equations.

In 114, a plurality of gradient structure equations may be established based on the plurality sets of two-dimensional surface equations and the plurality sets of minimal surface equations.

In some embodiments, the processing device may introduce the plurality sets of two-dimensional surface equations into the plurality sets of minimal surface equations so that a relative density of a structure in a plane may be distributed based on two-dimensional surface values, and the plurality of gradient structure equations may be obtained.

It should be understood that when a count of the plurality sets of two-dimensional surface equations is 3x and a count of the plurality sets of minimal surface equations is y, a count of the plurality of gradient structure equations may be 3x×y. When the count of the plurality sets of two-dimensional surface equations is u+v+w and the count of the plurality sets of minimal surface equations is y, the count of the plurality of gradient structure equations may be (u+v+w)×y.

For ease of descriptions, the pending parameters in FIGS. 2-7 may be uniquely deterministic values, i.e., the values of a, b, c, $\alpha$, $\beta$ and $\gamma$ may be the uniquely deterministic values. For example, the pending parameters in FIGS. 2-7 may be initial values corresponding to each of the pending parameters.

Figure 3:
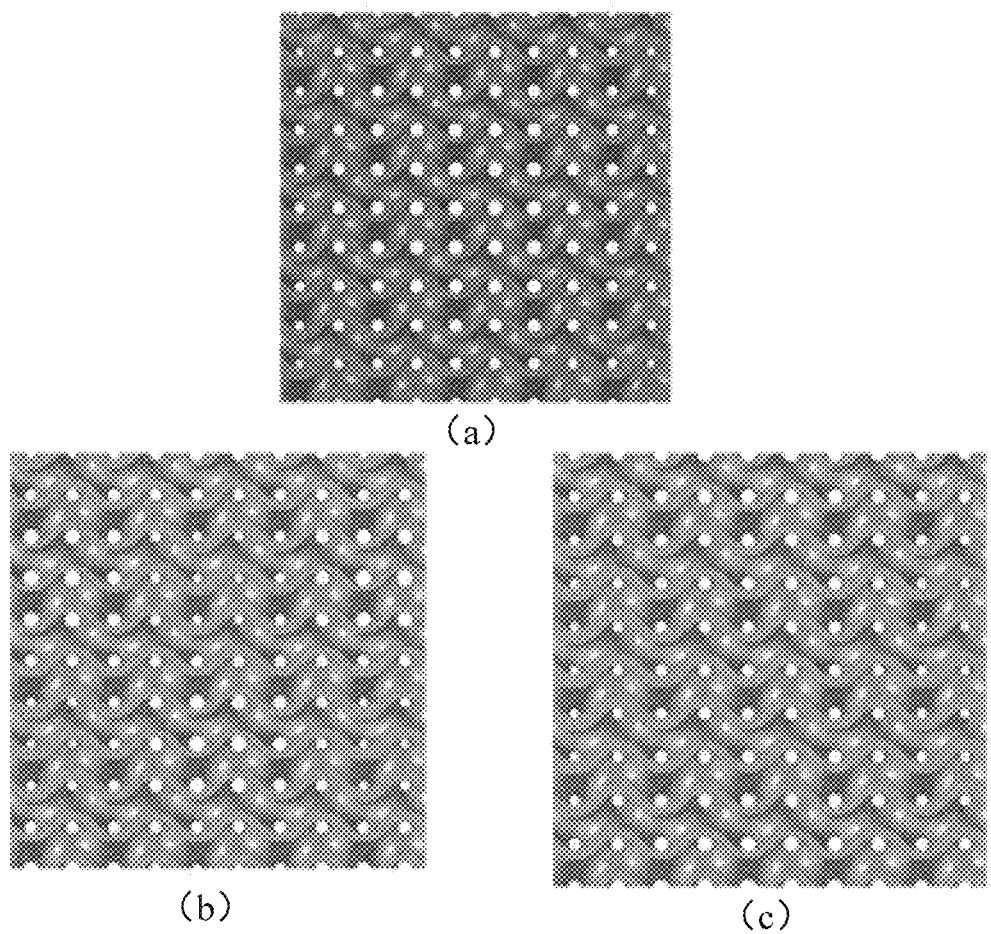
FIG. 3 is a schematic diagram illustrating three gradient structures according to some embodiments of the present disclosure.

FIG. 3 is a schematic diagram illustrating three gradient structures according to some embodiments of the present disclosure. FIG. 3(a) illustrates a gradient structure based on a quadratic surface. FIG. 3(b) illustrates a gradient structure based on a trigonometric surface. FIG. 3(c) illustrates a gradient structure based on a saddle surface. As illustrated in the fixture, FIG. 3(a)-(c) illustrate gradient minimal surface structures generated based on the quadratic surface, the trigonometric surface, and the saddle surface.

In 115, a plurality of three-dimensional models of the minimal surface structures may be generated based on the plurality of gradient structure equations.

In some embodiments, an equation of the plurality of three-dimensional models of the minimal surface structures may be expressed as an equation (5):

$$-c(x,y,z) \leq \varphi(x,y,z) \leq +c(x,y,z) \tag{5}$$

where in c(x, y, z) denotes a constant.

In some embodiments, the processing device may obtain the plurality of three-dimensional models of the minimal surface structures by modeling software based on the plurality of gradient structure equations obtained in the operation 114.

In some embodiments of the present disclosure, the gradient minimal surface structures refer to that a relative density of the minimal surface structures is distributed in an x-y plane based on the law of change of the two-dimensional surfaces, and an expression c(x, y, z) is expressed in terms of the two-dimensional surface equations, so that the law of change of the relative density of the minimal surface structures distributed in the x-y plane is in the same manner as a distribution of a magnitude of a z-value in the two-dimensional surfaces.

Figure 4:
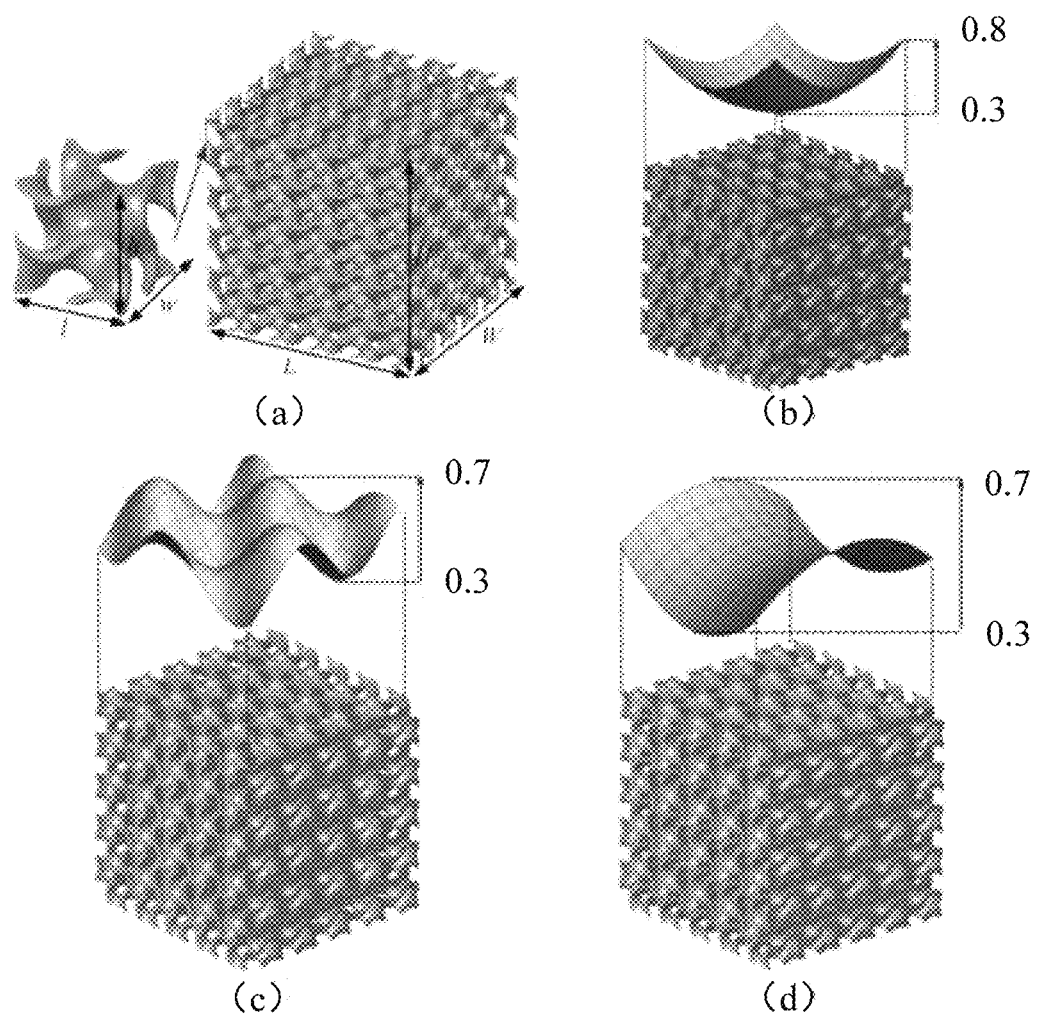
FIG. 4 is a schematic diagram illustrating three-dimensional models and density distribution laws of a Gyroid minimal surface structure and three gradient structures according to some embodiments of the present disclosure.

FIG. 4 is a schematic diagram illustrating three-dimensional models and density distribution laws of a Gyroid minimal surface structure and three gradient structures according to some embodiments of the present disclosure. FIG. 4(a) illustrates the Gyroid minimal surface structure. FIG. 4(b) illustrates relative density distribution laws based on a quadratic surface. FIG. 4(c) illustrates relative density distribution laws based on a trigonometric surface. FIG. 4(c) illustrates relative density distribution laws based on a saddle surface.

FIG. 4(b)-(d) illustrate relative density distribution laws of the three gradient structures, respectively. A relative density of each point position of the minimal surface structure in an x-y plane may correspond to a magnitude of a surface value. An interval of change in the relative density of the minimal surface structure in the x-y plane may be achieved by regulating the values of a, b and c in the surface equations. The plurality of three-dimensional models may be generated by programming through mathematical modeling software.

In 120, in response to determining that the plurality of three-dimensional models are generated, a making instruction may be generated and sent to an additive manufacturing device.

The additive manufacturing device refers to a device for creating an object using layer-by-layer buildup. For example, the additive manufacturing device may be a 3D printer.

The making instruction refers to an instruction configured to control the additive manufacturing device to make a plurality of gradient structure specimens through an additive manufacturing technique based on the plurality of three-dimensional models. In some embodiments, the making instruction may include the plurality of three-dimensional models, and operating parameters of the additive manufacturing device. The operating parameters of the additive manufacturing device may include a printing temperature, a platform temperature, a model layer height, a fill-in density, or the like. The operating parameters of the additive manufacturing device may be default values, or commonly used operating parameter values.

The plurality of gradient structure specimens refer to structure specimens generated by the additive manufacturing device based on the plurality of three-dimensional models. It should be understood that each of the plurality of gradient structure specimens may correspond to each of the plurality of three-dimensional models.

In some embodiments, the additive manufacturing device may make the plurality of gradient structure specimens using a fused deposition modeling (FDM) additive manufacturing technique. A substrate material of each of the plurality of gradient structure specimens may be made of a reinforced polylactic acid (PLA) material. Parameters of the plurality of gradient structure specimens obtained by additive manufacturing may be shown in Table 1.

TABLE 1

| Specimen No. | Actual size/mm | Mass/g | Loading speed |
| --- | --- | --- | --- |
| JY-0-1# | 25.06 × 25.02 × 25.46 | 4.95 | 1.5 mm/min |
| JY-0-2# | 25.10 × 24.98 × 25.54 | 4.93 | 1.5 mm/min |
| TD-1-1# | 25.10 × 25.08 × 25.08 | 4.74 | 1.5 mm/min |
| TD-1-2# | 25.04 × 25.06 × 25.08 | 4.73 | 1.5 mm/min |
| TD-2-1# | 25.10 × 25.16 × 25.02 | 4.89 | 1.5 mm/min |
| TD-2-2# | 25.06 × 25.12 × 25.04 | 4.90 | 1.5 mm/min |
| TD-3-1# | 25.00 × 25.10 × 25.10 | 5.10 | 1.5 mm/min |
| TD-3-2# | 25.00 × 25.08 × 25.00 | 5.10 | 1.5 mm/min |

JY-0-1 # and JY-0-2 # are the structure specimens corresponding to the Gyroid minimal surface structure. TD-1-1 # and TD-1-2 # are the gradient structure specimens corresponding to the quadratic surface. TD-2-1 # and TD-2-2 # are the gradient structure specimens corresponding to the trigonometric surface. TD-3-1 # and TD-3-2 # are the gradient structure specimens corresponding to the saddle surface. Tests were carried out using a quasi-static experimental machine. Loading speeds of the several gradient structure specimens under quasi-static compression were all 1.5 mm/min.

In some embodiments, in response to determining that the plurality of three-dimensional models are generated, a control center may automatically generate the making instruction, or enter the making instruction through user input, and send the making instruction to the additive manufacturing device through a network.

In 130, in response to determining that the plurality of gradient structure specimens are completed, a verification instruction may be generated and sent to a verification device.

The verification instruction refers to an instruction configured to control the verification device to perform a quasi-static compression test on the plurality of gradient structure specimens to obtain a plurality sets of structure stress-strain curves and force-displacement curves.

The verification device refers to a device capable of determining the plurality sets of structure stress-strain curves and/or force-displacement curves.

The quasi-static compression test refers to an experiment that reflects a relationship between compressive stress and strain on an object under a very slow loading rate.

The plurality sets of structure stress-strain curves refer to curves made in a coordinate system where a vertical coordinate represents the stress and a horizontal coordinate represents the strain.

FIG. 5 is a schematic diagram illustrating mechanical response and platform stress curves of three gradient structure specimens and a Gyroid minimal surface structure specimen according to some embodiments of the present disclosure. FIG. 5(a) illustrates stress-strain curves of the three gradient structure specimens and the Gyroid minimal surface structure specimen. FIG. 5(b) illustrates platform stress of the three gradient structure specimens and the Gyroid minimal surface structure specimen. The Gyroid minimal surface structure refers to a structure specimen generated by an additive manufacturing device based on a three-dimensional model corresponding to a Gyroid minimal surface.

As illustrated in FIG. 5, softening in the stress-strain curves of the three gradient structure specimens is significantly reduced, while the gradient structure specimen based on a saddle surface is about 18.32% higher than a structure in a curve platform.

The force-displacement curves refer to curves made in a coordinate system where a vertical coordinate represents force and a horizontal coordinate represents displacement.

Figure 6:
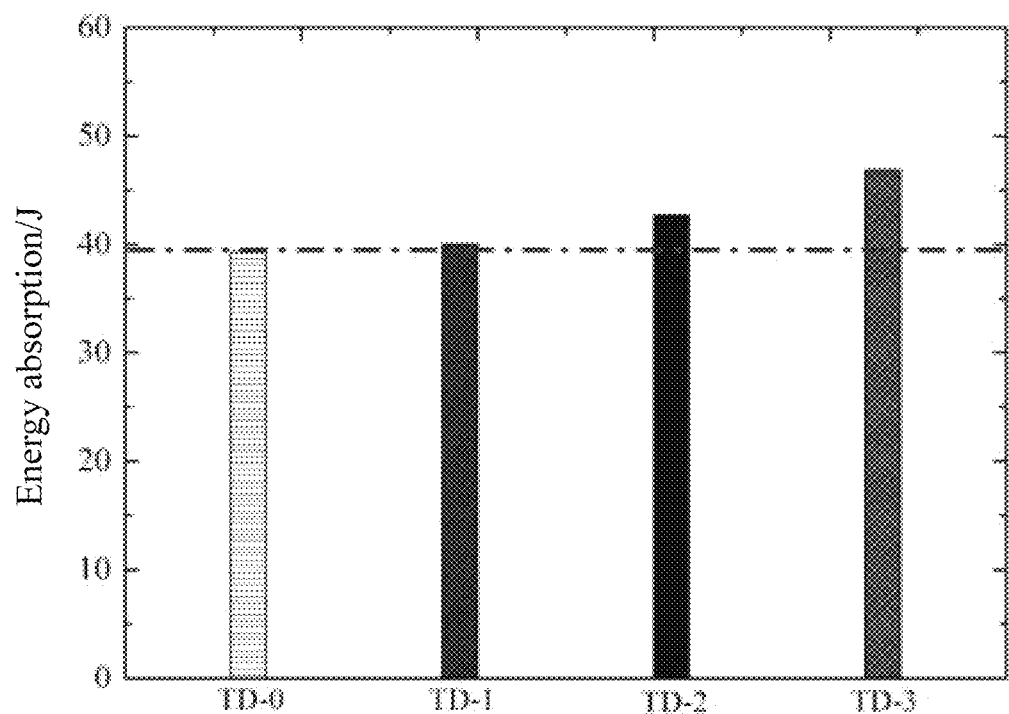
FIG. 6 is a histogram illustrating energy absorptions of three gradient structure specimens and a Gyroid minimal surface structure specimen according to some embodiments of the present disclosure.

FIG. 6 is a histogram illustrating energy absorptions of three gradient structure specimens and a Gyroid minimal surface structure specimen according to some embodiments of the present disclosure. As illustrated in FIG. 6, the gradient structure specimens based on a surface density distribution have significantly improved energy absorption performance for the same relative density, realizing substantial optimization of the mechanical properties of the structure. The gradient structure specimen based on the saddle surface improves energy absorption by 19.21% compared with the Gyroid minimal surface structure specimen, which indicates that the gradient structure specimen based on the saddle surface may improve the platform stress of the structure while smoothing a load capacity curve of the structure, which is more conducive to the energy absorption and reduces the impact of a high peak load on a protected target.

In some embodiments, in response to determining that the plurality of gradient structure specimens are completed, a control center may automatically generate a verification instruction, or enter the verification instruction by user input, and send the verification instruction to a verification device through a network.

In 140, an evaluation instruction may be generated based on the plurality sets of structure stress-strain curves and force-displacement curves and sent to the processing device.

The evaluation instruction refers to an instruction configured to control the processing device to calculate evaluation results for the plurality of gradient structure specimens based on the plurality sets of structure stress-strain curves and force-displacement curves, and determine target structure types based on the plurality of evaluation results.

In some embodiments, the control center may automatically generate the evaluation instructions based on the plurality sets of structure stress-strain curves and force-displacement curves, or enter the evaluation instruction by user input, and send the evaluation instruction to the processing device through a network.

The evaluation results are results for reflecting advantages and disadvantages of the plurality of gradient structure specimens. In some embodiments, the evaluation results may include at least the platform stress and the energy absorption. The platform stress and the energy absorption refer to energy absorption indexes. The greater the platform stress, the greater the energy absorption, and the better the plurality of gradient structure specimens.

In some embodiments, the processing device may calculate the platform stress and the energy absorption for the plurality of gradient structure specimens based on the plurality sets of structure stress-strain curves and force-displacement curves. For example, the processing device may obtain the platform stress through an equation (6), i.e., the processing device may substitute $E_V$ determined through an equation (7) into the equation (6) to obtain $\sigma_m$:

$$\sigma_m = \frac{E_V}{\varepsilon_D} \qquad (6)$$

$$E_V = \int_0^{\varepsilon_D} \sigma(\varepsilon) d\varepsilon \qquad (7)$$

wherein $\sigma_m$ denotes the platform stress, $E_V$ denotes an integral of the structure stress-strain curves, $\varepsilon_D$ denotes dense strain of a structure, and $\sigma(\varepsilon)$ denotes the structure stress-strain curves.

In some embodiments, the processing device may obtain the energy absorption by calculating through an equation (8):

$$E = E_V \times V \qquad$$

wherein E denotes the energy absorption, $E_V$ denotes the integral of the structure stress-strain curves, and V denotes a volume of the structure.

The target structure types refer to the plurality of three-dimensional models corresponding to the plurality of gradient structure specimens that satisfy a preset condition. In some embodiments, the count of the target structure types may set to one or more. In some embodiments, the preset condition may be that a weighted value is maximum. In some embodiments, the preset condition may be that the weighted value is not less than a preset weighted value. The processing device may determine the preset weighted value based on the user input. The weighted value may be a weighted value of the platform stress and the energy absorption. The processing device may determine a weight based on the user input. When the platform stress is more valued, the weight corresponding to the platform stress may be relatively large. When the energy absorption is more valued, the weight corresponding to the energy absorption may be relatively large.

In some embodiments, the processing device may calculate the platform stress and the energy absorption corresponding to the plurality of gradient structure specimens. Furthermore, the processing device may calculate the weighted value based on the platform stress and the energy absorption; and then the processing device may filter out the weighted value that satisfies the preset condition, and determine the three-dimensional model corresponding to the selected weighted value as the target structure type, so as to realize an optimized design of the gradient minimal surface structure based on a surface density.

In some embodiments, the evaluation results may include a deformation pattern feature in addition to including the platform stress and the energy absorption.

The deformation pattern feature refers to a feature that reflects a deformation stability of the plurality of gradient structure specimens. In some embodiments, the deformation pattern feature may be expressed by a rank. The larger the rank, the more stable the deformation, and the better the plurality of gradient structure specimens. In some embodiments, the deformation pattern feature may be expressed by comparing the deformation patterns of different gradient structure specimens and the Gyroid minimal surface structure specimen to filter out the gradient structure specimens with more stable deformation in combination with manual determination.

Figure 7:
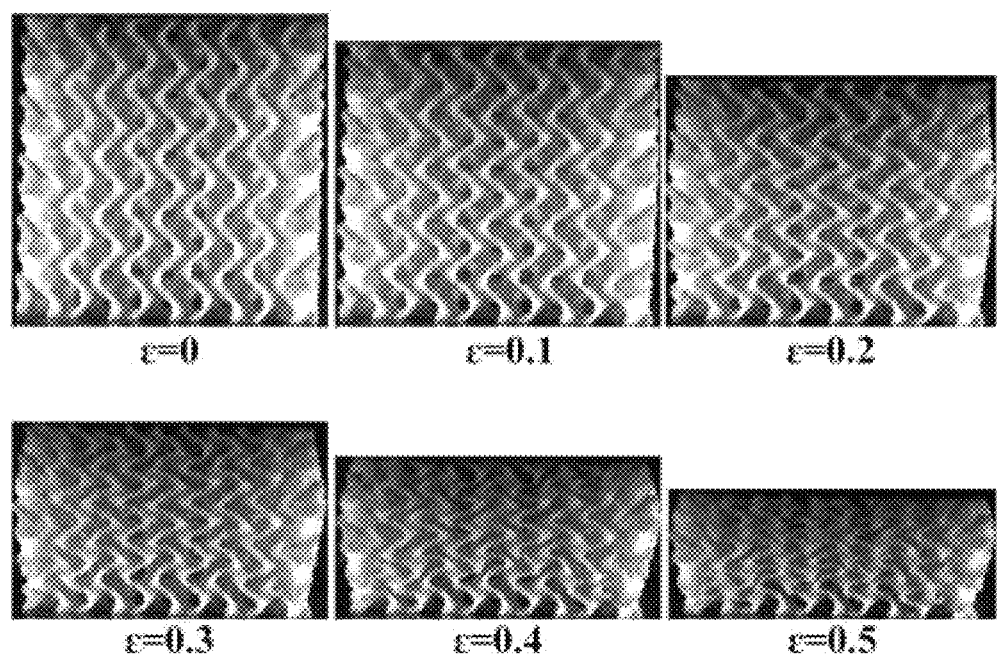
FIG. 7 is a schematic diagram illustrating a deformation process of a gradient structure specimen based on a saddle surface according to some embodiments of the present disclosure.

FIG. 7 is a schematic diagram illustrating a deformation process of a gradient structure specimen based on a saddle surface according to some embodiments of the present disclosure. As illustrated in the deformation process of the gradient structure specimen based on the saddle surface in FIG. 7 as a structure with the optimal mechanical properties under compressive loading, the deformation of the structure is very stable without obvious local deformation, which fully demonstrates that the design of a structure gradient feature based on a surface distribution, the deformation process of the minimal surface structure can be realized, and softening in a loading curve of the structure can be reduced, thereby improving the overall mechanical properties of the structure.

In 150, in response to determining that the target structure types are determined, an update instruction may be generated and sent to the processing device.

The update instruction refers to an instruction configured to control the processing device to convert the three-dimensional models, the evaluation results, the two-dimensional surface equations, and the minimal surface equations corresponding to the target structure types into standardized formats to be stored in a database, and generate an update message and transmit the update message to an operator through a computer network.

The operator refers to a user who implements the method for designing the gradient minimal surface structure based on the surface density distribution.

The standardized formats refer to uniform format requirements. The processing device may determine the standardized formats based on user input. The three-dimensional models, the evaluation results, the two-dimensional surface equations, and the minimal surface equations corresponding to the target structure types may be converted into the standardized formats for saving and transmission.

The database refers to a large, organized, and shareable collection of data stored in a computer over time. In some embodiments, the database may be located in a storage device.

The update message refers to a message indicating an update to the database. For example, the update message may include a data update. In some embodiments, in response to a change in the content in the database, the processing device may generate the update message based on the content stored in the database and transmit the update message to the operator through the computer network to enable the operator to know the update of the database in real time. In some embodiments, the processing device may also periodically generate the update message based on the content stored in the database at a preset time interval, and transmit the update message to the operator through the computer network.

In some embodiments, the control center may automatically generate the update instruction, or enter the update instruction by user input, and send the update instruction to the processing device through the network.

In some embodiments of the present disclosure, by determining the target structure types and obtaining the structure with optimal mechanical properties, the platform stress of the structure can be effectively enhanced, and the deformation stability and the energy absorption performance of the structure can be effectively improved, thereby compensating for the disadvantage of softening caused by the strain of a traditional minimal surface structure, and making the deformation of the structure more stable. A finite element computational model that considers geometric defects of 3D printing may be created based on real geometric information of a 3D printed component, so that the main geometric features of the printed component can be reflected.

It should be noted that the foregoing description of the design of the gradient minimal surface structure based on the surface density distribution is for the purpose of exemplification and illustration only, and does not limit the scope of the present disclosure. For a person skilled in the art, various modifications and corrections may be made to the design of the gradient minimal surface structure based on the surface density distribution under the guidance of the present disclosure. However, these modifications and corrections remain within the scope of the present disclosure.

In some embodiments, the processing device may replace the operations 111-112 with the following operations.

In a first operation, the processing device may obtain CPU performance features to determine initial values. The CPU performance features may include utilization, a process, a thread, and a CPU clock speed. The higher the CPU clock speed, the faster the CPU operation speed. For example, the processing device may determine the initial values by looking up a table.

In a second operation, the processing device may obtain, from the storage device, an instruction set corresponding to a preset generation algorithm. The preset generation algorithm may include a linear congruence manner and a Mersenne Twister manner. The instruction set refers to a set of instructions in a CPU configured to compute and control a computer system.

In a third operation, the processing device may generate pending parameters based on the initial values and the instruction set. For example, the processing device may input the initial values into a generation function of the preset generation algorithm to generate the pending parameters.

Figure 8:
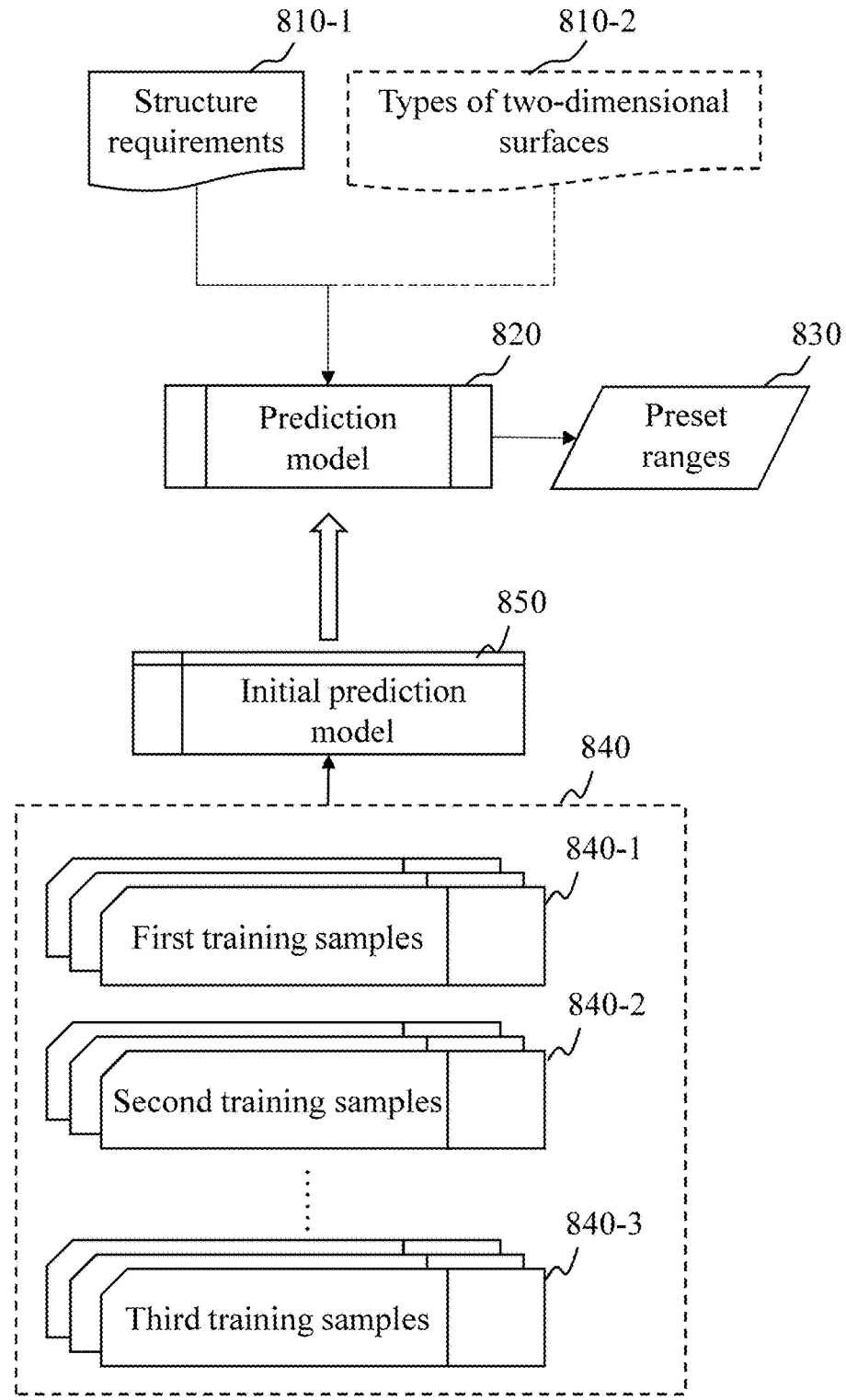
FIG. 8 is a flowchart illustrating a process for determining a preset range based on a prediction model according to some embodiments of the present disclosure.

FIG. 8 is a schematic diagram illustrating a process 800 for determining a preset range based on a prediction model according to some embodiments of the present disclosure.

In some embodiments, a prediction model 820 may be a deep learning neural network model. Exemplary deep learning neural network models may include Convolutional Neural Networks (CNN), Deep Neural Networks (DNN), Recurrent Neural Networks (RNN), or the like, or combinations thereof.

In some embodiments, an input of the prediction model 820 may include structure requirements 810-1, as illustrated in FIG. 8. In some embodiments, an output of the prediction model 820 may be preset ranges 830 of pending parameters. It should be noted that three two-dimensional surface equations may perform prediction of a set of preset ranges for a, b and c. For example, a range of a in a quadratic surface equation and a range of a in a trigonometric surface equation may be different. As a result, the preset range of a in the quadratic surface equation, the preset range of a in the trigonometric surface equation, the preset range of a in a saddle surface equation, the preset range of b in the quadratic surface equation, the preset range of b in the quadratic surface equation, the preset range of b in the quadratic surface equation, the preset range of c in the quadratic surface equation, the preset range of c in the trigonometric surface equation, and the preset range of c in the saddle surface equation may be ultimately be output, respectively.

The structure requirements 810-1 refer to performance requirements for target structure types. In some embodiments, the structure requirements 810-1 may include requirements for the platform stress, the energy absorption, and the deformation pattern feature of the target structure types. For example, the structure requirements 810-1 may include a requirement of A for the platform stress, a requirement of B for the energy absorption, and a requirement of level II for the deformation pattern feature, which may be represented by a structure requirement vector [A, B, 2].

In some embodiments, the input of the prediction model may also include types of two-dimensional surfaces.

In some embodiments, the processing device may determine the types of the two-dimensional surfaces based on user input. When the input of the prediction model includes the types of the two-dimensional surfaces, the output of the prediction model may include the preset ranges 830 of a, b and c corresponding to the types of the two-dimensional surfaces.

In some embodiments of the present disclosure, a customized preset range may be obtained by inputting the types of the two-dimensional surface, which is more in line with the user needs.

In some embodiments, the processing device may obtain the prediction model 820 by training an initial prediction model 850 using a plurality of training samples 840 with labels.

In some embodiments, the training samples 840 may include sample structure requirements, and the labels may include sample preset ranges of pending parameters corresponding to the training samples. In historical data, a plurality of gradient structure specimens may satisfy the requirements for the different structure requirements 810-1. The processing device may use ranges of the pending parameters corresponding to the plurality of gradient structure specimens that satisfy the different requirements as labels.

For example, if the structure requirements 810-1 include the requirement of A for the platform stress, the requirement of B for the energy absorption, and the requirement of level II for the deformation pattern feature, all the gradient structure specimens of which a difference between the platform stress and A is less than a first difference threshold, a difference between the energy absorption and B is less than a second difference threshold, and the deformation pattern features are level II may be selected from the historical data. The pending parameters of each of the gradient structure specimens may be obtained. Maximum and minimum values corresponding to each of the pending parameters may be determined as ranges corresponding to the pending parameters.

In some embodiments, the processing device may input the plurality of training samples 840 with the labels into the initial prediction model 850, construct a loss function based on the labels and output results of the initial prediction model 850, and iteratively update parameters of the initial prediction model 850 by gradient descent or other methods based on the loss function. When a preset condition is satisfied, model training may be completed, and the trained prediction model 820 may be obtained. The preset condition may be that the loss function converges, a count of iterations reaches a threshold, etc.

In some embodiments, the training samples 840 may also include types of sample two-dimensional surface.

In some embodiments, the processing device may determine the labels corresponding to different training sample sets based on the types of the two-dimensional surfaces, i.e., different types of the two-dimensional surfaces may correspond to the different training sample sets.

For example, the training samples 840 may include a first training sample 840-1, a second training sample 840-2, and a third training sample 840-3. A first training sample set refers to a training sample set in which target structure types includes a quadratic surface in the historical data. The first training sample set may include a plurality of first training samples 840-1. A second training sample set refers to a training sample set in which the target structure types include a trigonometric surface in the historical data. The second training sample set may include a plurality of second training samples 840-2. A third training sample set refers to a training sample set in which the target structure type includes a saddle surface in the historical data. The third training sample set may include a plurality of third training samples 840-3.

In some embodiments, the processing device may perform alternate training on the different training sample sets based on a scale condition. The scale condition refers to a count of training samples in different training sample sets. The scale conditions of different training sample sets may be related to a ratio of a count of the first training samples 840-1 to a count of the second training samples 840-2 to a count of the third training samples 840-3. For example, if the ratio of the count of the first training samples 840-1:the count of the second training samples 840-2:the count of the third training samples 840-3 is 1:2:5, the processing device may perform training for one time based on the first training samples 840-1, two times based on the second training samples 840-2, and five times based on the third training samples 840-3, and proceed in accordance with the above training cycle.

In some embodiments, the processing device may determine the count of different training sample sets based on a ratio of the count of the target structure types that include the types of the two-dimensional surfaces in the historical data. For example, if the ratio of the count of the target structure types that include the quadratic surface in the historical data:the count of the target structure types that include the trigonometric surface in the historical data:the count of the target structure types that include the saddle surface in the historical data is 1:2:5, the ratio of the count of the first training samples 840-1:the count of the second training samples 840-2:the count of the third training samples 840-3 may be 1:2:5. As another example, if the count of the target structure types that include the saddle surface in the historical data is a highest count, the count of the third training samples 840-3 may be the highest count.

In some embodiments, the different training sample sets may have different learning rates during a training process.

The learning rate refers to a step size at which the gradient moves toward an optimal solution of the loss function in each iteration. In some embodiments, the learning rate may be a single value corresponding to the learning rate throughout the training process. In some embodiments, the learning rate may be sequential data corresponding to the learning rates over a plurality of training stages. In some embodiments, the learning rate may be adjusted based on training sample features.

The training sample features refer to features capable of reflecting characteristics of the training samples. In some embodiments, the training sample features may include the types of the two-dimensional surfaces, a proportion of the count of the training sample set in all the training sample sets, and a reliability of the training samples.

In some embodiments, the processing device may determine the proportion of the training sample set in all the training sample sets based on the count of the training sample sets and the count of all the training sample sets. For example, if there are a total of 1000 training samples in all the training sample sets, and there are 300 training samples in the training sample sets including the quadratic surface, the proportion of the training sample sets including the quadratic surface in all the training sample sets may be 30%.

The reliability of the training samples refers to a value that reflects a consistency of the corresponding labels for the same or similar training samples (e.g., if a Euclidean distance between structure requirement vectors is less than a distance threshold, the processing device may determine distance threshold based on user input). It should be understood that the higher the consistency of the labels, the higher the reliability, and the better the training effect; and the lower the consistency of the labels, the lower the reliability, and the worse the training effect.

In some embodiments, the processing device may determine the reliability of the training samples based on a variance of the labels of the same or similar training samples. Since the labels are preset ranges, the variance of the labels may be an average of a variance between left boundaries of the preset ranges and a variance between right boundaries of the preset ranges. It should be understood that the larger the variance, the smaller the reliability; and the smaller the variance, the larger the reliability.

In some embodiments, the processing device may construct a feature data vector based on the training sample features, and determine, by searching a vector database, a reference feature data vector of which a similarity to the feature data vector is greater than a preset threshold. A reference learning rate corresponding to the reference feature data vector may be used as the learning rate. The preset threshold may be set based on experience. The feature data vector may be constructed based on the types of the two-dimensional surfaces, the proportion of the training sample set in all the training sample sets, and the reliability of the training samples.

In some embodiments of the present disclosure, alternating training and determining the learning rate can lead to faster training and higher prediction accuracy of the trained prediction model.

In some embodiments of the present disclosure, the preset ranges may be determined by the prediction model, which can quickly and accurately obtain the preset ranges, thereby realizing the optimized design of the gradient minimal surface structure based on the surface density.

In some embodiments, the method for designing the gradient minimal surface structure based on the surface density distribution may comprise the following operations.

S1, two-dimensional surfaces based on a structure density distribution may be established.

The two-dimensional surfaces may be constructed based on two-dimensional surface equations, and magnitudes of values of points in the two-dimensional surfaces may be regulated by changing different pending parameters in the two-dimensional surface equations. More descriptions regarding the two-dimensional surface equations may be found in FIG. 1 and the related descriptions thereof.

S2, minimal surface structures may be established.

The minimal surface structures may be established based on minimal surface equations. Wall thicknesses of the minimal surface structures may be regulated by changing the pending parameter of the minimal surface equations, so as to change a relative density of the structure. More descriptions regarding the minimal surface equations may be found in FIG. 1 and the related descriptions thereof.

S3, gradient structure equations may be established.

The two-dimensional surface equations may be introduced into the minimal surface equations based on the two-dimensional surface equations and the minimal surface equations in the operations S1 and S2, so that the relative densities of the minimal surface structures in a plane may be distributed based on two-dimensional surface values, and the gradient structure equations may be obtained. More descriptions regarding the gradient structure equations may be found in FIG. 1 and the related descriptions thereof.

S4, three-dimensional models of the minimal surface structure may be obtained based on the gradient structure equations obtained in the operation S3, and gradient structure specimens may be made by an additive manufacturing technique. More descriptions regarding the three-dimensional models and the gradient structure specimens may be found in FIG. 1 and the related descriptions thereof.

S5, a quasi-static compression test may be performed on the gradient structure specimen obtained in the operation S4, and a platform stress and an energy absorption of the gradient structure specimens may be calculated through structure stress-strain curves and force-displacement curves obtained from the quasi-static compression test. More descriptions regarding the structure stress-strain curves, the force-displacement curves, the platform stress and the energy absorption may be found in FIG. 1 and the related descriptions thereof.

S6. Performance of different types of gradient structure specimens may be evaluated in terms of mechanical response and energy absorption performance to obtain target structure types through screening, so that an optimized design of the gradient minimal surface structure based on the surface density can be realized. More descriptions regarding the target structure types may be found in FIG. 1 and the related descriptions thereof.

Finally, it should be noted that the above embodiments are only used to illustrate the technical solutions of the present disclosure rather than to limit them. Although the present disclosure has been described in detail with reference to the preferred embodiments, those having ordinary skills in the art should understand that it is still possible to perform modifications or equivalent replacements to the technical solutions of the present disclosure, and these modifications or equivalent replacements may not cause the modified technical solutions to depart from the spirit and scope of the technical solutions of the present disclosure.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for designing a gradient minimal surface structure based on a surface density distribution, comprising:

S1, establishing two-dimensional surfaces based on a structure density distribution, including:
constructing the two-dimensional surfaces based on two-dimensional surface equations, and regulating magnitudes of values of points in the two-dimensional surfaces by changing different parameter values in surface functions; wherein
the two-dimensional surfaces in the operation S1 comprises at least one of a quadratic surface, a trigonometric function surface, and a saddle surface; and two-dimensional surface equations corresponding to the quadratic surface, the trigonometric function surface, and the saddle surface, respectively, include:
a quadratic surface equation denoted as: $z=a(bx^2+by^2)+c$;
a trigonometric function surface equation denoted as:

$$z=a\cos(b\pi x)\sin(b\pi y)+c;\text{ and}$$

a saddle surface equation denoted as: $z=a(bx^2-by^2)+c$; wherein
a, b, and c denote constants configured to regulate a magnitude and a distribution interval of a z-value in a surface;

S2, establishing minimal surface structures, including:
establishing the minimal surface structures based on a modeling equation of a Gyroid minimal surface structure, and regulating wall thicknesses of the minimal surface structures by changing control parameters of the equation, so as to change relative densities of the structures; wherein
the modeling equation of the Gyroid minimal surface structure is denoted as (1):

$$\varphi(x,y,z)=\sin X\cos Y+\sin Y\cos Z+\sin Z\cos X=C; \quad (1)$$

wherein $X=2\alpha\pi x$, $Y=2\beta\pi y$, and $Z=2\gamma\pi z$, $\alpha$, $\beta$, and $\gamma$ denote constants configured to control a count of single cells of a structure along three directions;

S3, establishing gradient structure models, including:
introducing the two-dimensional surface equations into the equations of the minimal surface structures based on the two-dimensional surface equations and the equations of the Gyroid minimal surface structures in the operations S1 and S2, so that the relative densities of the minimal surface structures in a plane are distributed based on two-dimensional surface values, and modeling equations of gradient minimum surface structures are obtained;

S4, obtaining three-dimensional models of the minimal surface structures based on the equations of the gradient structures obtained in the operation S3, and making gradient structure specimens by an additive manufacturing technique; wherein
an equation of each of the three-dimensional models is denoted as (2):

$$-c(x,y,z)\leq\varphi(x,y,z)\leq+c(x,y,z) \quad (2),$$

wherein c (x, y, z) denotes a constant;

S5, performing a quasi-static compression test on the gradient structure specimens obtained in the operation S4, and calculating a platform stress and an energy absorption of the gradient structures through structure stress-strain curves and force-displacement curves obtained from the quasi-static compression test; and S6, evaluating performance of different types of gradient minimum surface structures in terms of mechanical response and energy absorption performance to obtain target structure types through screening, so that an optimized design of the gradient minimal surface structures based on the surface density is realized.

* * * * *